(12) United States Patent
Shin

(10) Patent No.: US 8,133,716 B2
(45) Date of Patent: Mar. 13, 2012

(54) MUNICIPAL SOLID WASTE TREATMENT METHOD AND APPARATUS

(75) Inventor: Dae-Kyun Shin, Seocho-Ku (KR)

(73) Assignee: Biocon, Inc., Seoul (KR)

( * ) Notice: Subject to any disclaimer, the term of this patent is extended or adjusted under 35 U.S.C. 154(b) by 1214 days.

(21) Appl. No.: 10/508,293

(22) PCT Filed: Mar. 20, 2003

(86) PCT No.: PCT/KR03/00546
§ 371 (c)(1),
(2), (4) Date: Apr. 29, 2005

(87) PCT Pub. No.: WO03/078084
PCT Pub. Date: Sep. 25, 2003

(65) Prior Publication Data
US 2005/0199028 A1    Sep. 15, 2005

(30) Foreign Application Priority Data

Mar. 20, 2002  (KR) .................. 10-2002-0015118
Jan. 28, 2003  (KR) .................. 10-2003-0005576

(51) Int. Cl.
*C02F 3/34* (2006.01)
(52) U.S. Cl. .............. 435/262; 435/290.4; 435/105; 435/209.3; 422/184.1; 71/8; 71/9; 71/10; 241/26; 241/277; 241/DIG. 38
(58) Field of Classification Search .......... 435/262, 435/105, 290.3, 290.4; 422/184.1; 71/8, 71/9, 10; 241/DIG. 38, 26, 277
See application file for complete search history.

(56) References Cited

U.S. PATENT DOCUMENTS 3,847,803 A * 11/1974 Fisk .............................. 210/605

(Continued)

FOREIGN PATENT DOCUMENTS

JP    05-123664    5/1993
(Continued)

*Primary Examiner* — William H Beisner
*Assistant Examiner* — Danielle Henkel
(74) *Attorney, Agent, or Firm* — Haverstock & Owens LLP

(57) ABSTRACT

The present invention pertains to a method and an apparatus for treating municipal solid waste, and more particularly to a method and an apparatus for treating and recycling municipal solid waste not separately collected, and also for minimizing the amount of final waste to be buried. To this end, the present invention is characterized by comprising the steps of: an input step of inputting the municipal solid waste and microorganisms to a reactor; a first reaction step of firstly reacting the municipal solid waste with the microorganisms input to the reactor in the input step; a first separation step of transferring first intermediate matters completing the first reaction in the reactor to a first separator and then separating organic matters (it may also comprise small-sized inorganic matters passing through the screen of the first separator, also referred to as "second intermediate matters") and inorganic matters, further comprising a recycled material recovering step of separating and recovering the recycled material by properties for recycling the inorganic matters; a second reaction step of transferring second intermediate matters passing through the first separator to a decomposing field constructed with good air circulation and then carrying out second reaction of the second intermediate matters; a second separation step of transferring third intermediate matters completing the second reaction in the decomposing field to a second separator and then separating foreign matters from the third intermediate matters; and a post-treatment step of post-treating fourth intermediate matters separated in the second separation step to make a final material.

6 Claims, 5 Drawing Sheets

U.S. PATENT DOCUMENTS

| | | | |
|---|---|---|---|
| 5,184,780 A * | 2/1993 | Wiens | 241/19 |
| 5,571,703 A * | 11/1996 | Chieffalo et al. | 435/105 |
| 5,584,904 A * | 12/1996 | Dalos | 71/9 |
| 5,593,600 A * | 1/1997 | Solomon | 210/787 |
| 2011/0121112 A1 * | 5/2011 | Alford | 241/15 |

FOREIGN PATENT DOCUMENTS

| | | | |
|---|---|---|---|
| JP | 07-039848 | | 2/1995 |
| JP | 09-276824 | | 10/1997 |
| JP | 2000-79385 | | 3/2000 |
| KR | 1999-0054961 | | 7/1999 |
| KR | 000004063 | | 1/2000 |
| KR | 000050008 | | 8/2000 |
| KR | 100299069 | * | 5/2001 |
| KR | 100299069 | | 6/2001 |

\* cited by examiner

MUNICIPAL SOLID WASTE TREATMENT METHOD AND APPARATUS

This application is a U.S. National Stage Application of PCT Application No. PCT/KR03/00546, filed on Mar. 20, 2003, designating the U.S., in which the International Application claims a priority date of Jan. 28, 2003, based on prior filed Korean Patent Application No. 10-2003-0005576 and a priority date of Mar. 20, 2002, based on prior filed Korean Patent Application No. 10-2002-0015118.

TECHNICAL FIELD

The present invention relates to a method and an apparatus for treating municipal solid waste, and more particularly to a method and an apparatus for treating municipal solid waste not separately collected and recycling the treated municipal solid waste, and also for minimizing the amount of final buried waste.

Waste means the materials not required for human living or business activities, including garbage, ash, sludge, waste oil, waste acid, waste alkali, dead animal bodies, etc.

The municipal solid waste mentioned in the present invention refers to solid waste, excluding liquid or gaseous waste among the waste discharged in a city that means a collective community (therefore, including all of the collective communities such as fishing or agrarian villages), includes household waste, general domestic waste discharged from a business site, and may also include the waste discharged from a business facility within the range not departing from similar constituents when it is integrated with the household waste and the general domestic waste from the business site.

That is, the municipal solid waste mentioned in the invention is considered to include all of organic and inorganic materials, for example, food waste, waste paper, wood, waste plastics, waste vinyl, waste iron, etc.

Hereinafter, the food waste, waste paper, wood, etc. are categorized as organic waste and the waste plastics, waste vinyl, waste iron, waste metals, etc. as inorganic waste.

BACKGROUND ART

Most of household waste has been conventionally buried or incinerated.

However, if the household waste that contains many organic components is buried, bad smells originating from methane gas are produced from a landfill site due to decomposition of the organic components. Water quality is also deteriorated, which results from polluted seepage water, and soil is also polluted due to buried recalcitrant biodegradable materials such as waste vinyl, etc.

Since existing landfill sites are already saturated, it is required to secure new landfill sites to continue to apply the conventional burial method.

In another way, household waste has been incinerated as a method of treating the household waste.

However, when incinerating the household waste that contains a considerable amount of wet waste such as food waste, harmful components such as dioxin, furan, etc. are discharged in turn to cause secondary environmental pollution.

In order not to generate the aforementioned harmful components, it was proposed to install pollution prevention facilities alternatively, but such an alternative was proved not appropriate in terms of economical efficiency and practicability.

Accordingly, it was alternatively proposed to separately collect, treat and then recycle only the food waste. However, the above alternative proposal has one restriction that only the food waste has to be separately collected. Even in the case to separately collect and treat the food waste, further treatment of the remaining waste, such as burial or incineration, is also required.

DISCLOSURE OF INVENTION

The present invention is devised to solve the aforementioned problems. It is an object of the present invention to provide a method and an apparatus for treating municipal solid waste not separately collected.

It is another object of the invention to provide a method and an apparatus for converting a large amount of the municipal solid waste into recyclable materials as well as treatment of the municipal solid waste.

Also, it is a still another object of the invention to provide a method and an apparatus for treating municipal solid waste that can minimize the amount of final municipal solid waste to be buried in a landfill site by reducing the volume of the waste through decomposition of organic materials, water evaporation, etc. in the treatment process of the municipal solid waste, in addition to the above conversion process for recycling.

In order to achieve the aforementioned objects, the method according to the present invention for treating municipal solid waste is characterized by comprising the steps of: an input step of inputting the municipal solid waste and microorganisms to a reactor; a first reaction step of firstly reacting the municipal solid waste with the microorganisms input to the reactor in the input step; a first separation step of transferring first intermediate matters completing the first reaction in the reactor to a first separator and then separating organic matters (it may also comprise small-sized inorganic materials passing through the screen of the first separator, also referred to as "second intermediate matters") and inorganic materials, further comprising a recycled material recovering step of separating and recovering the materials to be recycled by properties for recycling the inorganic matters; a second reaction step of transferring the second intermediate matters passing through the first separator to a decomposing field constructed with good air circulation and then carrying out second reaction of the second intermediate matters; a second separation step of transferring third intermediate matters completing the second reaction in the decomposing field to a second separator and then separating foreign matters from the third intermediate matters; and a post-treatment step of post-treating fourth intermediate matters separated in the second separation step to make decomposed soil that is a final material.

The first reaction step is characterized by adjusting the rotational speed of the reactor with a given capacity depending on properties or temporary variations in the amount of collected municipal solid waste.

The method according to the present invention is characterized by further comprising a crushing step of crushing the first intermediate matters discharged in the first reaction step to provide the crushed first intermediate matters to the first separator and/or crushing the inorganic matters separated in the first separation step to provide the crushed inorganic materials to the first separator again and/or crushing at least one of the cans and composite matters tangled with various materials, among the inorganic materials separated in the first separation step, then providing them to the first separator again.

The recycled material recovering step is characterized by comprising at least one of an air separation step, a magnetic separation step, an aluminum separation step and a hand separation step.

The post-treatment step is characterized in that it is a desalting step of washing a predetermined amount of the fourth intermediate matters and then mixing the washed matters with the remaining fourth intermediate matters, or washing all of the fourth intermediate matters, in order to adjust the salinity of the fourth intermediate matters.

The apparatus for treating municipal solid waste according to the invention is characterized by comprising:

a reactor having an inlet into which the municipal solid waste and microorganisms are input, a reaction unit in which the input municipal solid waste firstly reacts with the microorganisms, and an outlet from which the first intermediate matters completing the first reaction in the reaction unit are discharged, the inlet and the outlet of the reactor being different in height for constructing the reactor to be inclined, and the reactor being rotated; a first separator formed with a first sieve screen with a predetermined sieve diameter for separating organic matters (it may also comprise small-sized inorganic matters passing through the screen of the first separator, also referred to as "second intermediate matters") and inorganic matters from the first intermediate matters; a separating unit that may be at least one of an air separator, a magnetic separator, an aluminum separator and a hand separator for re-separating the inorganic matters separated by the first separator by properties of the inorganic matters; a decomposing field with an air supplier for secondly reacting the second intermediate matters passing through the first separator; and a second separator formed with a second sieve screen with a predetermined sieve diameter for separating foreign matters contained in third intermediate matters resulting from the second reaction in the decomposing field.

The apparatus for treating municipal solid waste according to the invention is characterized by further comprising a crushing means for crushing the first intermediate matters discharged from the reactor and then providing the crushed first intermediate matters to the first separator and/or separating and crushing the inorganic matters separated through the first separator and then providing the crushed inorganic matters to the first separator again and/or separating and crushing at least one of the cans and composite matters tangled with various materials from the inorganic matters separated through the first separator, and then providing them to the first separator again.

The apparatus for treating municipal solid waste according to the invention is characterized by further comprising at least one fan on the side of the outlet of the first separator and/or at least one fan at the inlet of the first separator, and also further comprising a collector, facing the at least one fan on the side of the first separator, for collecting floating foreign matters, and a dust collector for collecting dust generated in the collector.

BRIEF DESCRIPTION OF THE DRAWINGS

These and other features, aspects, and advantages of the present invention will become apparent through the following description of exemplary embodiments, illustrated in the appended drawings. In the drawings.

BEST MODE FOR CARRYING OUT THE INVENTION

Hereinafter, preferred embodiments of the present invention will be described in detail with reference to the accompanying drawings.

It should be noted that like reference numbers denote like components even in different Figures. Also, when describing the invention hereinafter, specific detailed description for the related known functions and configurations will be omitted when considered that it will unnecessarily make the subject of the invention unclear.

Figure 1:
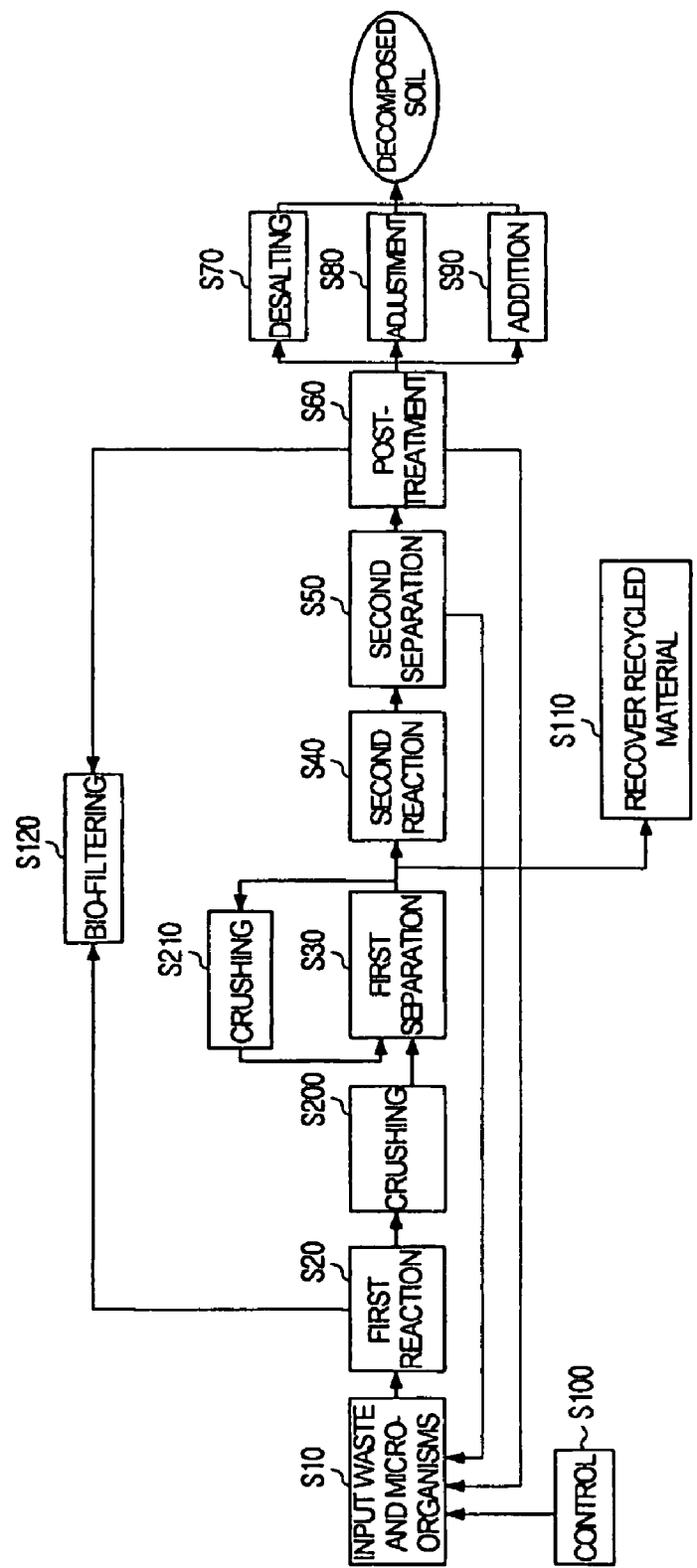
FIG. 1 is a process for treating municipal solid waste according to one embodiment of the invention.

FIG. 1 is a process for treating municipal solid waste according to one embodiment of the invention.

As shown in FIG. 1, the method of treating municipal solid waste according to the invention comprises the steps of an input step S10, a first reaction step S20, a first separation step S30, a second reaction step S40, a second separation step S50, and a post-treatment step S60, the post-treatment step comprising at least one of a desalting step S70, an adjusting step S80 and an addition step S90.

Also, the method of treating municipal solid waste according to the invention may further comprise at least one step of a control step S100, a recycled material recovering step S110, a bio-filtering step S120 or crushing steps S200 and S210.

In the input step S10, the municipal solid waste and microorganisms are input.

The microorganisms may be produced by mixing and then fermenting swine excretions, cattle excretions, chicken excretions, etc. in proper proportions, and decomposed soil for microorganisms can be used as a microorganism agent.

The decomposed soil for microorganisms is mixed with the raw materials to be decomposed for proliferating microbes, and may correspond to the intermediate matters produced in the process for treating municipal solid waste according to the invention.

The first reaction step S20 is carried out to firstly react the mixture of the municipal solid waste and the microorganisms or the decomposed soil containing the microorganisms ("decomposed soil for microorganisms") to provide the first intermediate matters, wherein the rotational speed of the reactor with a predetermined capacity can be controlled depending on temporary variations in the properties or the amount of collected municipal solid waste.

The first separation step S30 is carried out to separate inorganic matters and the second intermediate matters that are organic matters containing small-sized inorganic matters from the first intermediate matters completing the first reaction in the first reaction step S20 for obtaining the second intermediate matters.

The second reaction step S40 is carried out to secondly react the second intermediate matters separated in the first separation step S30 to provide third intermediate matters.

The second separation step S50 is carried out to separate foreign matters from the third intermediate matters completing the second reaction in the second reaction step S40 to provide fourth intermediate matters.

The post-treatment step S60 is carried out to post-treat the fourth intermediate matters separated in the second separation step S50 to provide final matters, comprising at least one step of desalting step S70, adjusting step S80 and addition step S90, as required.

The control step S100 is carried out to add a control agent to the municipal solid waste and the microorganisms input in the input step S10, for controlling a moisture content, and contents of salt and organic matters in the mixed municipal solid waste.

The recycled material recovering step S110 is carried out to recover inorganic matters for each property, separated in the first separation step S30 for recycling.

The desalting step S70 is carried out to control salinity so that the fourth intermediate matters can be utilized as decomposed soil.

The adjusting step S80 is carried out to prevent the fourth intermediate matters from scattering while adjusting the salinity so that the fourth intermediate matters can be used as decomposed soil.

The addition step S90 is carried out to add additives in order to improve the capability of the fourth intermediate matters when utilized as decomposed soil.

The bio-filtering step S120 is carried out to remove bad smells generated when treating the municipal solid waste.

The crushing steps S200 and S210 are at least one of the steps of crushing the first intermediate matters discharged in the first reaction step and then providing the crushed first intermediate matters to the first separator 20; or crushing the inorganic matters separated in the first separation step and then providing the crushed inorganic matters to the first separator 20 again; or separating and crushing at least one of the cans and composite matters tangled with various materials from the inorganic matters separated in the first separation step and then providing them to the first separator 20 again.

Figure 2:
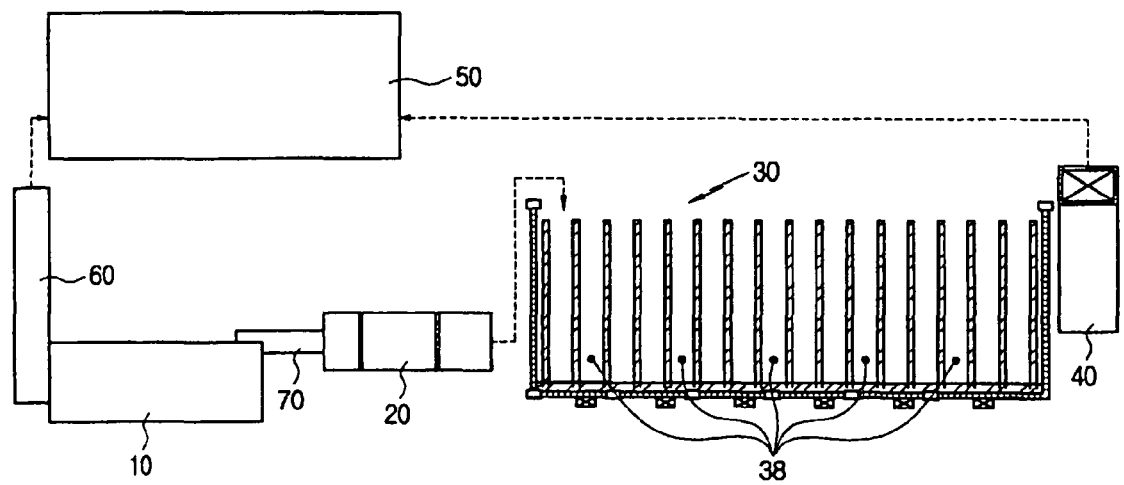
FIG. 2 is a schematic diagram of an apparatus for treating municipal solid waste according to one embodiment of the invention.

FIG. 2 is a schematic diagram of an apparatus for treating municipal solid waste according to one embodiment of the invention.

As shown in FIG. 2, the apparatus for treating the municipal solid waste according to the invention comprises a reactor 10, a first separator 20, a decomposing field 30, a second separator 40 and a bio-filter 50. The apparatus for treating the municipal solid waste according to the invention comprises at least one of various components such as a separator, a crushing means, a gravity dehydration and salt-washing means, a forced quick dehydration salt-washing means, a rotational speed control means, etc., not shown in FIG. 2.

Figure 3:
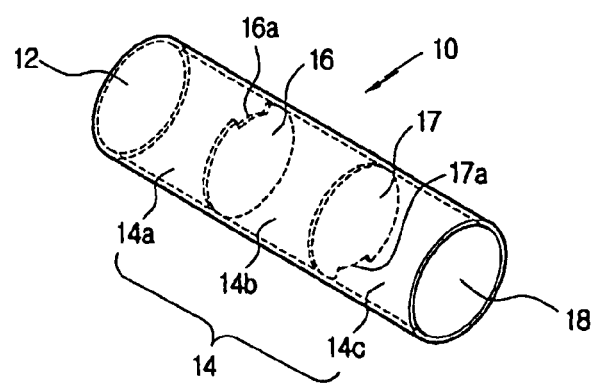
FIG. 3 is a perspective of a reactor in the apparatus for treating municipal solid waste of FIG. 2.

FIG. 3 is a perspective view of the reactor in the apparatus for treating the municipal solid waste of FIG. 2.

As shown in FIG. 3, the reactor 10 firstly reacts the municipal solid waste with microorganisms and/or the decomposed soil for the microorganisms, having an inlet 12, a reaction unit 14 and an outlet 18, the inlet 12 and the outlet 18 being different in height, the reactor 10 thus being constructed inclined and being rotated.

The inlet 12 is a portion where the municipal solid waste and microorganisms (and/or decomposed soil for the microorganisms) are input, and the outlet 18 is a portion where the input municipal solid waste and microorganisms (and/or decomposed soil for the microorganisms) are discharged after reaction thereof.

In the reaction unit 14, the mixture of the municipal solid waste and the decomposed soil for microorganisms input to the inlet 12 is substantially reacted, the reaction unit 14 being divided into a first, a second and a third reaction chambers 14a, 14b and 14c by means of a first and a second separators 16 and 17, and the first and the second separators 16 and 17 being formed with a first and a second openings 16a and 17a, respectively.

The reactor 10 also has a predetermined capacity, and further comprises a rotational speed control means (not shown) for controlling the rotational speed thereof, depending on temporal variations in the properties or the amount of collected municipal solid waste. The rotational speed control means comprises a conventional means for controlling the rotational speed of the reactor 10.

Figure 4A:
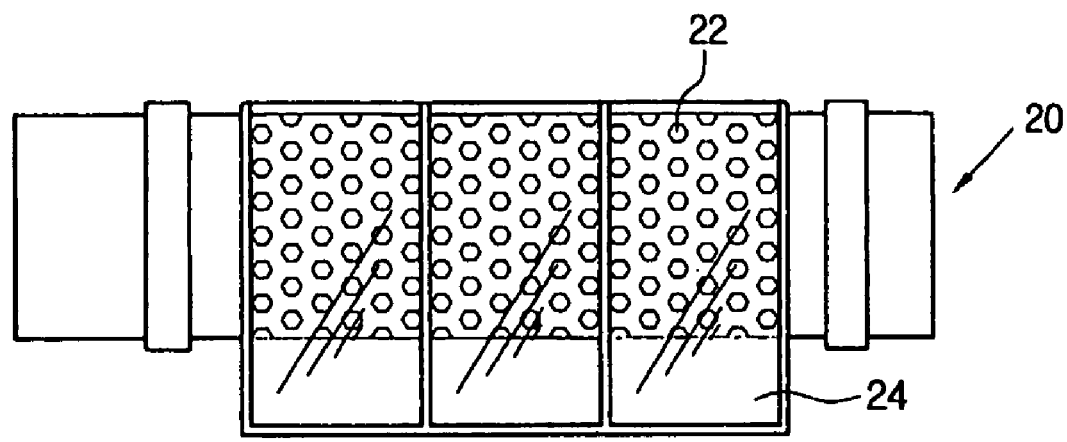
FIG. 4a is a lateral view of a first separator in the apparatus for treating municipal solid waste of FIG. 2.

FIG. 4a is a lateral view of the first separator 20 in the apparatus for treating municipal solid waste of FIG. 2.

The first separator 20 is a drum-shaped unit for separating organic matters and inorganic matters from the first intermediate matters completing the first reaction in the reactor 10. On the outer surface of the first separator 20, a first sieve screen 22 with a predetermined sieve diameter is formed. The first sieve screen 22 may typically a trommel screen, etc.

The sieve diameter of the screen 22 is desirably 20 to 40 mm.

In the decomposing field 30 (see FIG. 2), the second intermediate matters passing through the first separator 20 are secondly reacted, and the decomposing field 30 comprises an air supplier 32 and an automatic controller (not shown) for automatically controlling the amount of air to be supplied depending on temperature.

Figure 5A:
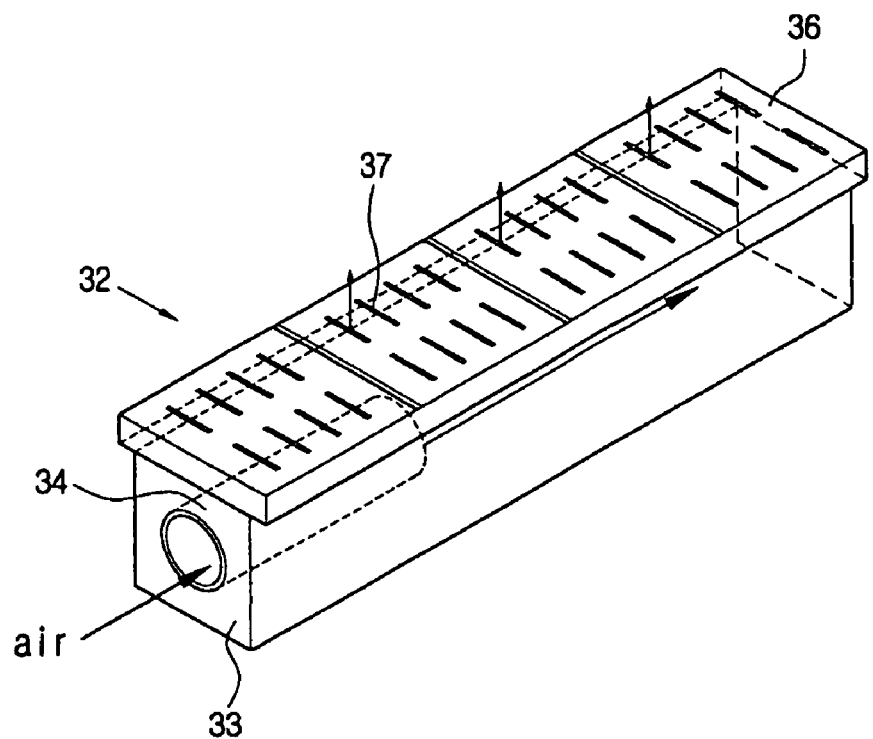
FIG. 5a is a detailed perspective of an air supplier according to one embodiment of a decomposing field in the apparatus for treating municipal solid waste of FIG. 2.
Figure 5B:
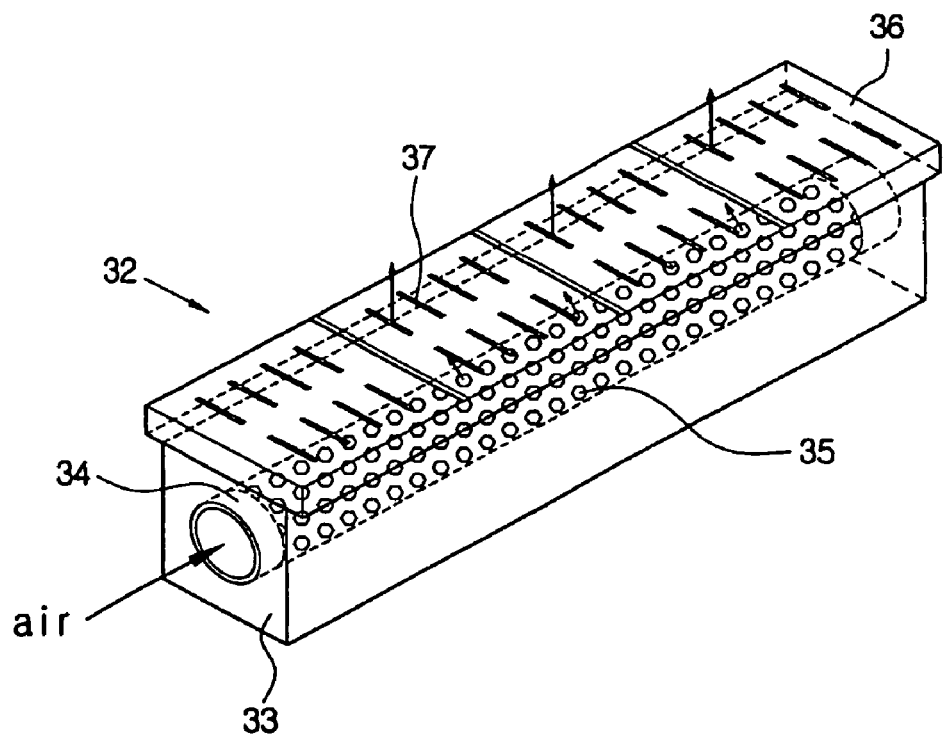
FIG. 5b is a detailed perspective of an air supplier according to another embodiment of the decomposing field in the apparatus for treating municipal solid waste of FIG. 2.

FIGS. 5a and 5b are detailed perspective views of the air supplier 32 of the decomposing field 30 in the apparatus for treating the municipal solid waste of FIG. 2.

The air supplier 32 supplies air so that the second intermediate matters can be reacted with the microorganisms contained therein in the decomposing field 30, and comprises a pipe 34 and a cover 36.

Through the pipe 34, air is supplied in by means of an air supply fan (not shown), wherein the pipe 34 is inserted into one end of a groove with a predetermined diameter formed on the bottom of the decomposing field 30.

According to one embodiment of the air supplier 32, the air supplier 32 is formed short so that the pipe 34 can be inserted up to a part of the groove 33, as shown in FIG. 5a.

According to another embodiment of the air supplier 32, the air supplier 32 is formed long so that the pipe 34 can be inserted into the full length of the groove 33, the pipe 34 having a plurality of through holes as shown in FIG. 5b.

The cover 36 covers the groove 33 or the pipe 34 so that the second intermediate matters can not fall onto the groove 33 or the pipe 34, and has slits 37 formed at predetermined intervals to supply the air incoming from the pipe 34 to the second intermediate matters.

Figure 4B:
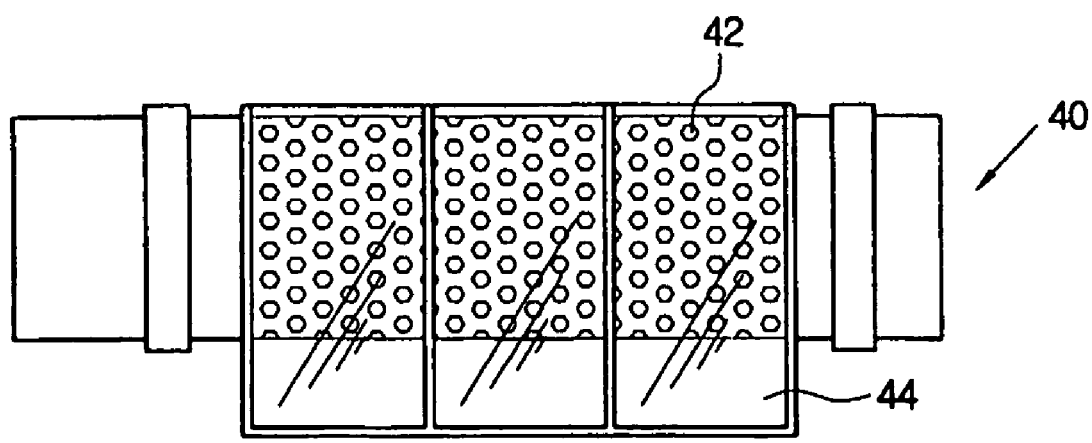
FIG. 4b is a lateral view of a second separator in the apparatus for treating municipal solid waste of FIG. 2.

FIG. 4b is a lateral view of the second separator 40 in the apparatus for treating the municipal solid waste of FIG. 2.

The second separator 40 is a drum-shaped unit for separating foreign matters from the third intermediate matters completing the second reaction in the decomposing field 30, and has a second sieve screen 42 with a predetermined sieve diameter on the outer surface thereof.

The sieve diameter of the sieve screen 42 is desirably 2 to 10 mm.

The bio-filter 50 (see FIG. 2) removes bad smells generated in the process of treating the municipal solid waste, and comprises an absorber, a pipe and a bio-filter medium (not shown).

Figure 6:
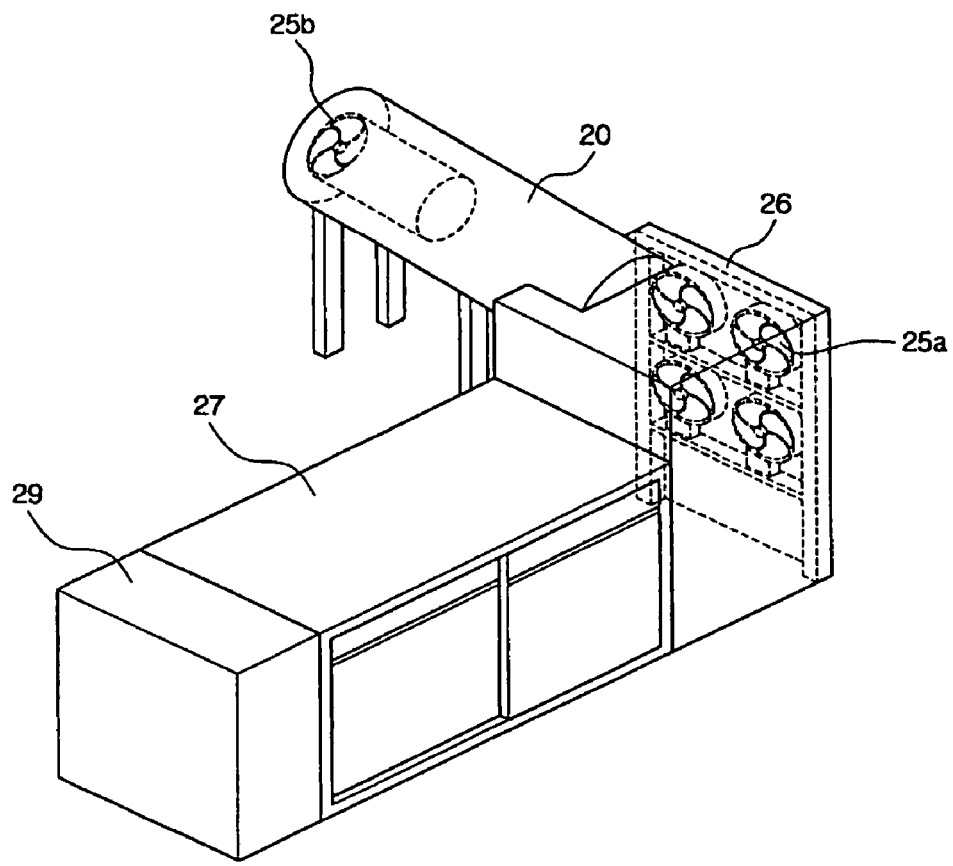
FIG. 6 shows fans arranged on the side and at the inlet of the first separator and a collector facing the fans on the side, respectively.
Figure 7:
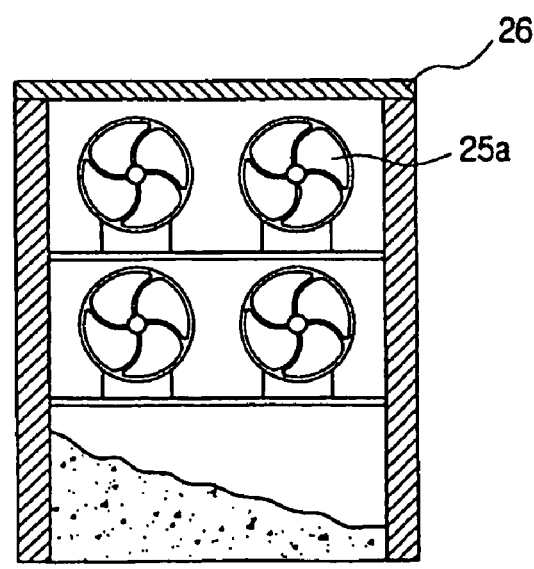
FIG. 7 is a front view of the fans and a fan mount arranged on the side of the first separator.

FIG. 6 shows fans 25a and 25b, a collector 27 and a dust collector 29, arranged on the side and at the inlet of the first separator 20, respectively. FIG. 7 is a front view showing fans and a fan mount arranged on the side of the first separator 20.

In one embodiment, the fan mount 26 on the side of the first separator 20 is provided with four fans 25a and one fan 25b is installed at the inlet of the first separator 20. It is allowed to install at least one fan only on the side of the outlet of the first separator 20, or to install at least one fan only at the inlet of the first separator 20 or to install fans both on the side of the outlet and at the inlet of the first separator 20, as required.

If fans 25a are installed on the side of the outlet of the first separator 20 for inorganic matters to be discharged from the first separator 20 (trommel screen, etc.) to the outlet thereof, it is possible to properly adjust the number of fans, blow angles, strength of blows, locations of blows, etc., appropriate to the properties of the discharged matters in order to maximize the effect of air separation.

In order to achieve more improved effect of blows, if at least one fan is installed additionally at the inlet of the first separator 20, the effect of blows by the side fans 25a acting on the scattered matters can be improved by scattering vinyl or plastic matters from the inside of the first separator 20 and thus subsequently increasing the time of scattering the scattered matters at the outlet of the first separator 20.

If the fans are run, vinyl or plastic matters of small specific gravity may be scattered wide to result in a messy work site. In order to prevent such a situation and to efficiently collect scattered vinyl or plastic matters, etc., it is desirable to install the collector 27 at the location facing the fans 25a installed on the side of the first separator 20. It is also possible to construct air openings (now shown) at the rear of the collector 27 to allow the air by the fans to pass through. In this case, since dust generated in the collector 27 may fly through the air openings, it is thus desirable to install the dust collector 29 near to the collector 27 to collect such dust.

Hereinafter, the process of treating municipal solid waste according to the invention will be described with reference to the drawings.

The transfer means to be described in the invention includes general means for transferring articles such as conveyers, vehicles, etc., and the decomposed soil described in the invention includes general decomposed soil, soil improvers, soil cover materials for made-land, etc.

As shown in FIG. 2, the municipal solid waste, microorganisms and/or the decomposed soil for microorganisms are input to a first transfer means 60. The mixing ratio (volumetric ratio) of the municipal solid waste and the decomposed soil for microorganisms (may contain the second intermediate matters in the present invention) input to the first transfer means 60 is preferably in the order of 3:1 to 3:2.

The mixing ratio is a value defined for inoculating microorganisms for control of moisture contents and smooth progress of fermentation.

The municipal solid waste may have a different moisture content depending on the composition of raw materials by the characteristics of regions and seasons.

If too much moisture is contained in the municipal solid waste, it is allowed to add a more amount of control agent.

For example, if the moisture content is approximately 40% or less, the moisture required for raising the microorganisms is not sufficient and the capability of temperature control is lowered, so that raising the microorganisms is inhibited. If the moisture content is approximately 60% or more, the microorganisms are at the anaerobic state, bad smells are generated from the municipal solid waste and satisfactory fermentation is not achieved. Therefore, the moisture content of the mixture to which the control agent is added is preferably in the order of 40% to 60%.

The control agent can control salinity and the content of organic matters as well as the moisture content. The control agent may be at least one of corrugated paper, newspaper, waste paper, sawdust, refuse from gardens, sewage sludge, livestock waste, agricultural waste, aquatic waste, plant-processing waste, beverage industry waste, wood-sawing or cutting waste, or a mixture thereof. A disadvantage of sawdust is its expensive cost.

The municipal solid waste, the decomposed soil for microorganisms and the control agent ("mixture") are input to the inlet 12 of the reactor 10 by the first transfer means 60. The reactor 10 has the inlet 12 and the outlet 18 in different height so that the reactor 10 is constructed inclined, and can be rotated.

The present invention is characterized in that the municipal solid waste among the matters to be input to the reactor 10 is input, irrespective of separate collection, that is to say whether separated or not separated. The municipal solid waste contained in vinyl bags including the measured-rate-system waste bags among the matters input to the reactor 10 may be input to the reactor 10, with the bags not broken (of course, broken bags may be input), and is then crushed while the bags are broken as the reactor 10 is rotated. When the bags are broken, the contents in the bags are discharged to the outside of the bags, and are reciprocatively agitated following the rotation of the reactor 10. Crushing of the contents proceeds along with mutual friction thereof and the friction with the reactor 10 body.

The organic waste in the mixture is decomposed by the microorganisms in the reactor 10, and thus fermentation heat is generated, reaching approximately 40 to 60° C.

Since the aforementioned reaction is a high-temperature heat generation process, a considerable amount of the moisture contained in the mixture is removed.

The mixture input to the inlet 12 is transferred to a first reaction chamber 14a and the reaction thereof is initiated in the first reaction chamber 14a. The mixture whose reaction is initiated in the first reaction chamber 14a is transferred to a second reaction chamber 14b along a first opening 16a formed on a first separator 16 to proceed with the reaction thereof.

The mixture whose reaction proceeds in the second reaction chamber 14b is transferred to a third reaction chamber 14c along a second opening 17a then to proceed with the reaction thereof.

It is desirable to control the amount of air so that the temperature in the second reaction chamber 14b may be kept at 40 to 60° C. A reason to keep the temperature in the second reaction chamber 14b at 40 to 60° C. is that the temperature is suitable for activities of high-temperature microorganisms (microbes), so that high-temperature fermentation of the mixture is thereby forwarded, and decomposition is maximized.

The reactor 10 according to the invention also has a predetermined capacity, and may further comprise a rotational speed control means for controlling the rotational speed thereof depending on temporal variations of the properties and the amount of collected municipal solid waste. The rotational speed control means is used to control the state of the first intermediate matters completing the reaction depending on the treatment purpose in the first reaction step.

As aforementioned, the reactor 10 achieves breaking of bags, crushing, mixing, agitating and high-speed fermentation of the input contents. When the rotational speed of the reactor 10 changes for the operations, the treatment effect for the contents input to the reactor 10 changes. That is to say, increasing the rotational speed of the reactor 10 achieves increased treatment effect, but decreasing the rotational speed of the reactor 10 results in reduced treatment effect. In this case, the treatment effect by the rotational speed of the reactor 10 is not always proportionally equal to the effect in respective performance items of breaking of bags, crushing, mixing, agitating, fermentation, etc. of the contents.

On the basis of the principle, when the rotational speed of the reactor 10 is changed, it is possible to control the stay time of the contents in the reactor 10 while achieving the same treatment effect on some items of the treatment effect for the first intermediate matters. That is, when the rotational speed is reduced, the stay time can be extended while achieving the same treatment effect on some items of the treatment effect. When the rotational speed is increased, it is possible to reduce the stay time while achieving the same treatment effect on some items of the treatment effect.

By using the correlation between the rotational speed and the treatment effect, the rotational speed of the reactor 10 is controlled to adjust the state of the first intermediate matters completing the reaction according to the treatment purpose in the first reaction step. That is to say, when the rotational speed is reduced, the treatment capacity of the reactor 10 is reduced by extending the stay time of the contents input to the reactor 10, while increasing the fermentation effect and thereby achieving reduction of the treatment time in the decomposing field. When the rotational speed is increased, it is possible to increase the treatment capacity of the reactor 10 by reducing the stay time of the contents input to the reactor 10. Such a difference in treatment effect following the difference in the rotational speed is properly selected according to the regional characteristics and contributes to increasing the treatment effect.

For example, if the properties of municipal solid waste require a long period of high-speed fermentation or the amount of collected waste is too small basically or temporarily, or the area of the land for the decomposing field is not sufficient, it is possible to reduce the required land by extending the stay time in the reactor 10 to cope with the situational problem. If the properties of the municipal solid waste do not require high-speed fermentation for a long period of time, or the amount of collected waste is too much basically or temporarily, or the area of land for the decomposing field is sufficient, it is possible to achieve adequacy depending on a situational condition by reducing the stay time in the reactor 10.

The rotational speed of the reactor 10 according to the invention is preferably 0.2 rpm to 5 rpm.

After the mixture completes the first reaction in the reactor 10 and becomes first intermediate matters, the first intermediate matters are input to the first separator 20 by means of a second transfer means.

As the first separator 20 is rotated, the matters (second intermediate matters of organic matters containing small-sized inorganic matters) smaller than the sieve diameter of the first sieve screen 22 fall onto the portion below the first separator 20, but the matters larger than the sieve diameter of the first screen 22 (mainly inorganic matters) stay and are rotated in the first separator 20 and then discharged through the outlet of the first separator 20.

In order to prevent the matters falling out of the first screen 22 from being scattered in the area outside b the screen 22, a first cover 24 such as a vinyl cover, etc. can be installed at the outside of the first separator 20.

The matters to be discharged through the outlet of the first separator 20 are generally inorganic matters not decomposed by microorganisms in the reactor 10.

Most of moisture contained in the inorganic matters is removed while passing through the first reactor 10 and organic matters are separated while passing through the first separator 20.

The inorganic matters are dried well and can be recycled as they are because only very small organic matters are attached thereonto.

Therefore, it is possible to separate and recover plastic, vinyl, iron, metals, etc. by their properties from the inorganic matters for recycling.

That is to say, matters of small specific gravity such as vinyls, plastics and the like can be separated and recovered by air, metals of large gravity such as iron or cans by magnetic force, an aluminum separator or manually for recycling. Components such as fiber, rubber, etc. can be separated and recovered for recycling.

As shown in FIGS. 6 and 7, the present invention preferably comprises at least one fan 25a, a fan mount 26 for installing the at least one fan 25a on the side of the outlet of the first separator 20, and a collector 27 for collecting foreign matters floating in the area facing the at least one fan 25a, in order to maximize the effect of separation by properties. The present invention may further comprise at least one fan 25b at the inlet of the first separator 20 to improve the blowing effect by the at least one fan 25a on the side of the outlet of the first separator 20. Dust generated in the collector 27 may also fly and it is thus desirable to install a dust collector 29 near to the collector 27.

If air force is exerted on the foreign matters discharged from the first separator 20 using a fan, deviations in scattering distances of foreign matters occur depending on the weight of the foreign matters. Accordingly, heavy matters such as iron scraps and lumps of masses of composite matters formed by tangled foreign matters are accumulated at the portion right below the first separator 20. Unlike the heavy matters, vinyl or plastic matters of small gravity are scattered farther away from the portion and thus collected in the collector 27. In an intermediate portion between the two portions, a small amount of fiber, rubber, some vinyl matters, etc. are mixedly scattered. The vinyl and plastic matters scattered farther are collected by the collector and then transferred to the recycling process. The matters in the intermediate portion where fiber, rubber and vinyl matters are mixedly scattered are separated into fiber, rubber, vinyl matters, etc. through simple hand separation. Preferably, the vinyl matters selected in this portion are added to the vinyl matters collected in the collector 27, and then transferred to the recycling process. The fiber, rubber and the like is preferably recycled or buried after considering the economical efficiency of the matters.

The heavy matters such as iron scraps are separated by hand if a small amount is discharged, but iron scraps, aluminum and the like are automatically separated through a conveyer belt equipped with a magnetic separator, an aluminum separator and the like if a large amount thereof is discharged. The remaining matters can then be separated by hand.

The iron scraps among the heavy matters accumulated in the lower portion of the outlet may include cans containing the second intermediate matters, masses of composite matters formed by various tangled foreign matters, leather, etc. In this case, the cans including the second intermediate matters must be crushed to separate the second intermediate matters contained inside the cans. The composite matters formed by tangled foreign matters have to be untangled to separate them by materials. The matters that require such crushing and untangling must be crushed manually or using a crusher, etc. and then transferred to the first separator again, so that the above process is repeated to complete the separation process.

The aforementioned crushing process may be applied to the first intermediate matters discharged at the outlet of the first reactor and before being input to the first separator, or to the entire inorganic matters passing through and then discharged from the first separator. The crushing process is preferably positioned considering factors of the crushing effect and crushing cost. For example, if the first intermediate matters before inputting them to the first separator are crushed, it is advantageous that input of the matters to the first separator is limited once by crushing the matters to be crushed once. However, in this case, it is disadvantageous that the amount of the matters to be crushed increases, resulting in increased crushing cost, and expensive crushing equipment is required because composite matters must be crushed. In addition, another disadvantage is that harmful materials are spread and then may be contained in the second intermediate matters in a region with the matters containing relatively many harmful components in the first intermediate matters discharged. Crushing all of the inorganic matters after being discharged from the first separator disadvantageously requires additional expenses to transfer the matters to the first separator again, as compared with the crushing the matters before inputting them to the first separator basically, but advantageously prevents the harmful materials from being included in the second intermediate matters. If only heavy matters other than vinyl and plastic matters among the inorganic matters discharged from the first separator are crushed, such a crushing process advantageously reduces the crushing cost but disadvantageously increases expenses for the transfer process for the crushed matters to the first separator again. The crushing process may further comprise a crushing step for crushing at least one of cans and composite matters formed by various tangled materials among the inorganic matters separated in the first separating step and then providing them to the first separator again.

As described above, it is desirable to determine the position of the crushing process, considering regional characteristics.

The recyclable matters separated through the recyclable material recovering step S110 are transferred to the recycling process and the matters improper for recycling are classified into final foreign matters and buried. Transferring matters separated by the properties of materials to the recycling process is made by hand, or by means of transfer means such as a loader, a vehicle, etc. The recyclable matters may also be transferred automatically to the recycling process by installing a conveyer belt for delivering the matters by properties.

The second intermediate matters (typically organic matters) passing through the first separator 20 are transferred to the decomposing field 30 via a third transfer means (not shown).

The second intermediate matters transferred via the third transfer means (not shown) are secondly reacted in the decomposing field 30.

For the second reaction, air is supplied to the decomposing field 30 via the air supplier 32.

As shown in FIGS. 5a and 5b, the air supplier 32 supplies air to the pipe 34 installed in the groove 33 via a fan (not shown), etc. The air incoming through the pipe 34 or the through holes 35 of the pipe 34 is supplied to the second intermediate matters via the slits 37 of the cover 36.

As shown in FIG. 2, the decomposing field 30 is partitioned into a plurality of sections.

Accordingly, the second intermediate matters are transferred to the next section, while being turned upside down depending on degrees of reaction.

In addition, in order to control temperature in second reaction, a temperature sensor 38 is installed in the decomposing field 30. Depending on the temperature sensed by the temperature sensor 38, a reaction temperature controller (not shown) controls temperature in reaction. The reaction temperature is electronically precisely controlled, using a computer.

When the temperature of the intermediate matters in the decomposing field 30 is approximately 30° C., it is considered that the second reaction is completed. That is, fermentation of the organic waste among municipal solid waste by means of the input microorganisms is considered to be completed through the first reaction step S20 and the second reaction step S40.

The third intermediate matters completing the fermentation in the decomposing field 30 enters on an after-ripening period and are transferred to the second separator 40 via a fourth transfer means (not shown).

Preferably the second separator 40 is formed with a second sieve screen 42 with a sieve diameter of 2 mm to 10 mm.

When the second separator 40 is rotated, the matters smaller than the sieve diameter of the second screen 42 fall to the outside of the second separator 40, but those larger than the sieve diameter of the second screen 42 stay and are rotated inside the second separator 40 and then discharged through the outlet of the second separator 40.

In order to prevent the matters falling to the outside of the second screen 42 from flying, a second cover 44 such as a vinyl cover may be installed outside the second separator 40.

The fourth intermediate matters passing through the second separator 40 may contain a small amount of inorganic waste, but is proper for being used as decomposed soil.

If required, the fourth intermediate matters undergo the post-treatment step S60 in order to utilize them as decomposed soil.

The post-treatment step may comprise the desalting step S70.

In the desalting S70, salinity is controlled so that the fourth intermediate matters can be utilized as decomposed soil, if required.

When all of the fourth intermediate matters are intended to be desalted, the desalting step S70 is carried out to add moisture to the fourth intermediate matters, to extract salt contained in the fourth intermediate matters and thus to reduce the salinity to a ratio less than a predetermined ratio, and comprises the steps of supplying water, dehydrating moisture in the fourth intermediate matters completing extraction, purifying the waste water resulting from dehydration, etc. Various processes can be applied depending on the method for carrying out the above respective processes.

The desalting step S70 must be carried out in a predetermined condition. That is to say, the decomposed soil must contain 1% or less of salt together with 25% or more of organic matters, and the ratio of the organic matters to nitrogen (CN ratio) must be kept 50 or less. The desalting step S70 involves loss of organic matters and nitrogen at the same time. In some cases it is impossible to reach the desired ratio of organic matters due to excessive loss of organic matters if it is intended to achieve only washing of salt. In another case, the ratio of carbon to nitrogen may exceed 50 due to excessive loss of nitrogen. By the aforementioned reasons, washing of salt must be carried out within the range keeping the organic ratio and the ratio of carbon to nitrogen within predetermined values, while washing of salt is achieved.

It is desirable to consume the smallest amount of water to be used when washing salt in order to reduce the amount of used water, but it is also required to reduce the amount of wastewater to be treated. It is desirable to minimize the amount of used water and to make the wastewater in the most advantageous condition be discharged. When washing salt, it is required to achieve dehydration and drying with the smallest amount of cost. An optimum salt washing process must be designed, considering the restrictions of technical capability and economical efficiency.

Considering the aforementioned conditions, in this embodiment, the fourth intermediate matters containing about 20 to 30% of moisture and 1.7% of salt are accumulated approximately 15 cm in height in a container of a predetermined capacity, with its top and bottom openings being open. Subsequently, while the bottom opening of the container is closed, water corresponding to about 150 to 170% of the weight of the fourth intermediate matters is poured into the container. After a predetermined period of time elapses so that salt can be extracted, the bottom opening is opened to drain the water, but dehydration is intended by means of the natural gravity. If the amount of water for desalting is about 150% or less of the weight of the fourth intermediate matters, good desalting is not accomplished. If the amount of the water is about 170% or more of the weight of the fourth intermediate matters, however, a greater amount of water is used, resulting in a greater amount of wastewater to be discharged. Therefore, it is desirable to select an optimum amount of water to be used in order to achieve good desalting but minimize the amount of wastewater to be discharged.

The following table shows salt contents, ratios of organic matters and the ratios of organic matters to nitrogen (CN ratio) in the decomposed soil through the aforementioned desalting step.

TABLE 1

Salt contents, ratios of organic matters, ratios of organic matters to nitrogen (CN ratios) in decomposed soil according to this embodiment (in the fourth intermediate matters containing about 20 to 30% of moisture and 1.7% of salt content)

|  | Test 1 | Test 2 | Test 3 | Test 4 | Test 5 | Test 6 |
| --- | --- | --- | --- | --- | --- | --- |
| Salt Contents | 0.2 | 0.2 | 0.3 | 0.3 | 0.3 | 0.6 |
| Ratios of organic matters | 28.5 | 41.8 | 28.2 | 34.0 | 39.9 | 33.4 |
| CN ratios | 45.9 | 40.2 | 39.8 | 46.6 | 35.6 | 35.5 |

As shown in Table 1, the decomposed soil through the desalting step according to the invention contains 1% or less of salt and has 25% or more of organic matters, and 50 or less of organic matters to nitrogen (CN ratios) since excessive loss of organic matters and nitrogen is prevented.

As described above, the present invention significantly reduced the cost by carrying out dehydration through the gravity dehydration-salt-washing means using natural gravity. The decomposed soil through the desalting step was made so that the moisture content was about 50 to 60%, and then stayed in the decomposing field for a predetermined period of time to be dried for the moisture content of about 30 to 40% that is a typical moisture content. In addition, a given cohesion process was applied to the wastewater discharged in this process, and subsequently purified through a 10-micro filter. As a result of purification, the wastewater reached the level of effluent by diluting the wastewater with the same amount of moisture as the resultant purified water.

When a predetermined amount of the fourth intermediate matters is washed, the ratio of the fourth intermediate matters to be washed is obtained by the following equation.

$$\text{Salinity} (1-A) = 1.0 \tag{1}$$

$$A = 1 - (1/\text{salinity}) \tag{2}$$

For example, if the salinity is 1.3, the ratio of the fourth intermediate matters to be washed is $1-(1/1.3)=0.231$ according to the equation (2), resulting in 23.1% of the fourth intermediate matters.

The fourth intermediate matters through the desalting step S70 and the adjusting step S80 can be reused as decomposed soil, but an additive may be added for improving the capability of the decomposed soil.

In addition, bad smells discharged from the reactor 10 and those generated inside a treatment plant such as the first separator 20, the decomposing field 30, etc. are purified by means of the bio-filter 50.

The additive may be oyster shells that contain a significant amount of calcium carbonate and can thus be used as a pH control agent and a bulking agent.

The bad smells are sucked by means of a sucker (not shown) installed in the treatment plant, move along a pipe (not shown) installed on one side of the treatment plant and then pass through layered bio-filter media (not shown).

The bad smells are purified while passing through the bio-filter media, which are layers of pebbles, wooden pieces, compost, decomposed soil, oyster shells, etc.

The aforementioned embodiment is only for specific illustration of the invention, and is not intended to limit the scope of the invention. All of simple modifications and changes in design of the invention should be considered to be covered within the spirit and the scope of the invention.

As described above, the method and the apparatus for treating municipal solid waste according to the invention allows general municipal solid waste not separately collected to be treated simultaneously by applying the bio-reaction and separation processes at the same time.

According to the invention, high efficiency in treating the municipal solid waste is also accomplished while the municipal solid waste is treated whether the waste is separately collected or bags of the waste are broken.

According to the invention, it is also possible to achieve the effect to respond to unstable situations of the deviations, for example, differences in the properties of the municipal solid waste and seasonal deviations of the amount of collected municipal solid waste, etc., with a reactor of the same capacity, by controlling the rotational speed of the reactor.

According to the invention, the inorganic matters completing the first reaction in the reactor have been considerably dehydrated onto which very small organic matters are attached. Therefore, plastic, vinyl, iron, and metal matters, etc. among the inorganic matters can be separated by properties to be recycled after recovery and it is thus possible to minimize the amount of municipal solid waste to be buried.

According to the invention, since organic matters are decomposed and much moisture is evaporated at the first reaction in the reactor and the second reaction step in the decomposing field, it is also possible to minimize the amount of municipal solid waste to be buried.

The invention claimed is:

1. A method of treating municipal solid waste, comprising the steps of:
   an input step of inputting one or more unbroken waste bags including the municipal solid waste and microorganisms to a reactor having an axis of rotation inclined and having an inlet into which the one or more unbroken waste bags are input and an outlet with a height lower than the height of the inlet;

a first reaction step of firstly reacting organic matter among the municipal solid waste with the microorganisms input to the reactor in the input step, the first reaction step comprising simultaneously:

breaking the one or more unbroken waste bags including the municipal solid waste through fall dropping and mutual friction while the reactor is rotating, crushing the organic matter among the municipal solid waste discharged from the broken waste bags through fall dropping and mutual friction while the reactor is rotating, decomposing the crushed organic matter among the municipal solid waste with the microorganisms, and removing a considerable amount of moisture in the municipal solid waste with the biological heat produced by the decomposition of the crushed organic matter;

a first separation step of transferring first intermediate matter completing the first reaction in the reactor to a first separator and then separating the crushed organic matter below a predetermined size (also comprising inorganic matter below the predetermined size passing through a screen of the first separator, referred to as "second intermediate matter") and uncrushed inorganic matter above the predetermined size, further comprising a recycled material recovering step of separating and recovering the recycled material by properties for recycling the uncrushed inorganic matter;

a second reaction step of transferring second intermediate matter including the crushed organic matter below the predetermined size passing through the first separator to a decomposing field constructed with good air circulation and then carrying out the second reaction of the second intermediate matter with the microorganisms;

a second separation step of transferring third intermediate matter completing the second reaction in the decomposing field to a second separator and then separating foreign matter from the third intermediate matter; and a post-treatment step of post-treating fourth intermediate matter separated from the third intermediate matter in the second separation step to make decomposed soil that is a final material;

characterized by further comprising the crushing step of crushing by a mechanical means the uncrushed inorganic matter above the predetermined size separated from the crushed organic matter in the first separation step to provide the crushed inorganic matter to the first separator again.

2. A method of treating municipal solid waste, comprising the steps of:

an input step of inputting one or more unbroken waste bags including the municipal solid waste and microorganisms to a reactor having an axis of rotation inclined and having an inlet into which the one or more unbroken waste bags are input and an outlet with a height lower than a height of the inlet;

a first reaction step of firstly reacting organic matter among the municipal solid waste with the microorganisms input to the reactor in the input step, the first reaction step comprising simultaneously:

breaking the one or more unbroken waste bags including the municipal solid waste through fall dropping and mutual friction while the reactor is rotating, crushing the organic matter among the municipal solid waste discharged from the broken waste bags through fall dropping and mutual friction while the reactor is rotating, decomposing the crushed organic matter among the municipal solid waste with the microorganisms, and removing a considerable amount of moisture in the crushed municipal solid waste with the biological heat produced by the decomposition of the organic matter;

a first separation step of transferring first intermediate matter completing the first reaction in the reactor to a first separator and then separating the crushed organic matter below a predetermined size (also comprising inorganic matter below the predetermined size passing through a screen of the first separator, referred to as "second intermediate matter") and uncrushed inorganic matter above the predetermined size, further comprising a recycled material recovering step of separating and recovering the recycled material by properties for recycling the uncrushed inorganic matter;

a second reaction step of transferring second intermediate matter including the crushed organic matter below the predetermined size passing through the first separator to a decomposing field constructed with good air circulation and then carrying out a second reaction of the second intermediate matter with the microorganisms;

a second separation step of transferring third intermediate matter completing the second reaction in the decomposing field to a second separator and then separating foreign matter from the third intermediate matter; and a post-treatment step of post-treating fourth intermediate matter separated from the third intermediate matter in the second separation step to make decomposed soil that is a final material;

characterized in that the recycled material recovering step comprises at least one of an air separation step, a magnetic separation step, an aluminum separation step and a hand separation step and the post-treatment step comprises at least one of a desalting step to extract salt contained in the fourth intermediate matter or an addition step by adding an additive into the fourth intermediate matter to improve the capability of the decomposed soil.

3. An apparatus for treating municipal solid waste, characterized by comprising:

a reactor having:

an inlet into which one or more unbroken waste bags including municipal solid waste and microorganisms are input, a reaction unit in which one or more unbroken waste bags including the input municipal solid waste and the microorganisms are subject to a first reaction forming a first intermediate matter, wherein in the first reaction one or more unbroken waste bags including the municipal solid waste are broken through fall dropping and mutual friction while the reaction unit is rotating, the organic matter among the municipal solid waste discharged from broken waste bags is crushed through fall dropping and mutual friction while the reaction unit is rotating, the crushed organic matter among the municipal solid waste is decomposed with the microorganisms, and simultaneously a considerable amount of moisture in the municipal solid waste is removed with the biological heat produced by the decomposition of the crushed organic matter, and further wherein the reaction unit comprises at least two chambers separated by a separator formed with an opening so as to carry out the first reaction sequentially through the chambers based on the inclination of the reactor and the rotational speed, and an outlet from which the first intermediate matter completing the first reaction in the reaction unit is output, wherein a height of the outlet is lower than a height of the inlet for constructing an axis of rotation of the reactor to be inclined;

a controller coupled to the reactor that controls the rotational speed of the reactor based on one or more properties of the municipal solid waste and/or the amount of the municipal solid waste within the reactor;

a first separator formed with a first sieve screen with a predetermined sieve diameter for separating the crushed organic matter below a predetermined sieve diameter (also comprising inorganic matter below the predetermined sieve diameter passing through a screen of the first separator, also referred to as "second intermediate matter") and uncrushed inorganic matter above the predetermined sieve diameter among the first intermediate matter;

a separating unit that may be at least one of an air separator, a magnetic separator, an aluminum separator and a hand separator for re-separating the uncrushed inorganic matter above the predetermined sieve diameter separated from the uncrushed organic matter by the first separator by the properties of the inorganic matter;

a decomposing field with an air supplier for secondly reacting the second intermediate matter including the crushed organic matter below the predetermined sieve diameter passing through the first separator with the microorganisms; and a second separator formed with a second sieve screen with a predetermined sieve diameter for separating foreign matter contained in third intermediate matter resulting from the second reaction in the decomposing field.

4. The apparatus as claimed in claim 3, further comprising a crushing means for crushing uncrushed inorganic matter above the predetermined size among the uncrushed inorganic matter separated through the first separator and then providing the crushed inorganic matter below the predetermined size to the first separator again.

5. A method of treating municipal solid waste comprising:
inputting one or more unbroken waste bags including the municipal solid waste and microorganisms into a reactor having an axis of rotation inclined and having an inlet into which the one or more unbroken waste bags are input and an outlet with a height lower than a height of the inlet;

reacting organic matter among the municipal solid waste with the microorganisms in the reactor through a first reaction forming a first intermediate matter, wherein the first reacting comprises simultaneously:
 breaking the one or more unbroken waste bags including the municipal solid waste through fall dropping and mutual friction while the reactor is rotating,
 crushing the organic matter among the municipal solid waste discharged from broken waste bags through fall dropping and mutual friction while the reactor is rotating,
 decomposing the crushed organic matter among the municipal solid waste with the microorganisms, and
 removing a considerable amount of moisture in the municipal solid waste with the biological heat produced by the decomposition of the crushed organic matter;

transferring the first intermediate matter to a first separator upon completion of the first reaction, then separating the crushed organic matter below a predetermined size (also comprising inorganic matter below the predetermined size passing through a screen of the first separator, referred to as "second intermediate matter") and uncrushed inorganic matter above the predetermined size, and recovering recycled material from the separated uncrushed inorganic matter for recycling by using deviations in scattering distances of the separated uncrushed inorganic matter depending on weight of the separated uncrushed inorganic matter when exerting an air force on the separated uncrushed inorganic matter;

transferring the second intermediate matter including the crushed organic matter below the predetermined size to a decomposing field configured to circulate air, wherein the second intermediate matter undergoes a second reaction in the decomposing field forming a third intermediate matter;

transferring the third intermediate matter to a second separator upon completion of the second reaction, wherein the second separator separates foreign matter from the third intermediate matter forming a fourth intermediate matter; and post-treating the fourth intermediate matter such that decomposed soil is formed, wherein the post-treatment step comprises at least one of a desalting step to extract salt contained in the fourth intermediate matter or an addition step for adding an additive into the fourth intermediate matter to improve the capability of the decomposed soil.

6. An apparatus for treating municipal solid waste comprising:
a. a reactor comprising:
 (1) an inlet into which one or more unbroken waste bags including municipal solid waste and microorganisms are input;
 (2) a reaction unit in which the one or more unbroken waste bags including the input municipal solid waste and the microorganisms are subject to a first reaction forming a first intermediate matter, wherein in the first reaction the municipal solid waste is broken through fall dropping and mutual friction while the reaction unit is rotating, the organic matter among the municipal solid waste discharged from broken waste bags is crushed through fall dropping and mutual friction while the reaction unit is rotating, the crushed organic matter among the municipal solid waste is decomposed with the microorganisms, and simultaneously a considerable amount of moisture in the municipal solid waste is removed with the biological heat produced by the decomposition of the crushed organic matter, and further wherein the reaction unit comprises at least two chambers separated by a separator formed with an opening, so as to carry out the first reaction sequentially through the chambers based on the inclination of the reactor and the rotational speed; and
 (3) an outlet from which the first intermediate matter completing the first reaction in the first reactor is output, wherein a height of the outlet is lower than a height of the inlet for constructing an axis of rotation of the reactor to be inclined;
b. a first separator comprising a first sieve screen with a predetermined sieve diameter for separating the crushed organic matter below a predetermined sieve diameter (also comprising inorganic matter below the predetermined sieve diameter passing through the screen of the first separator, also referred to as "second intermediate matter") and uncrushed inorganic matter above the predetermined sieve diameter among the first intermediate matter;

c. a separating unit comprising an air separator and at least one of a magnetic separator, an aluminum separator and a hand separator for re-separating the uncrushed inorganic matter separated from the crushed organic matter by the first separator and recovering recycled material from the separated uncrushed inorganic matter for recycling, wherein the air separator exerting an air force on the separated uncrushed inorganic matter to re-separate the separated uncrushed inorganic matter by using deviations in scattering distances of the separated uncrushed inorganic matter depending on weight of the separated uncrushed inorganic matter when exerting an air force on the separated uncrushed inorganic matter;

d. a decomposing field having an air supplier for subjecting the second intermediate matter including the crushed organic matter below the predetermined sieve diameter with the microorganisms passing through the first separator to a second reaction forming a third intermediate matter;

e. a second separator comprising a second sieve screen with a predetermined sieve diameter for separating foreign matter contained in the third intermediate matter resulting from the second reaction in the decomposing field; and f. a controller coupled to the reactor that controls the rotational speed of the reactor based on one or more properties of the municipal solid waste and/or the amount of the municipal solid waste within the reactor.

* * * * *